UNITED STATES PATENT OFFICE.

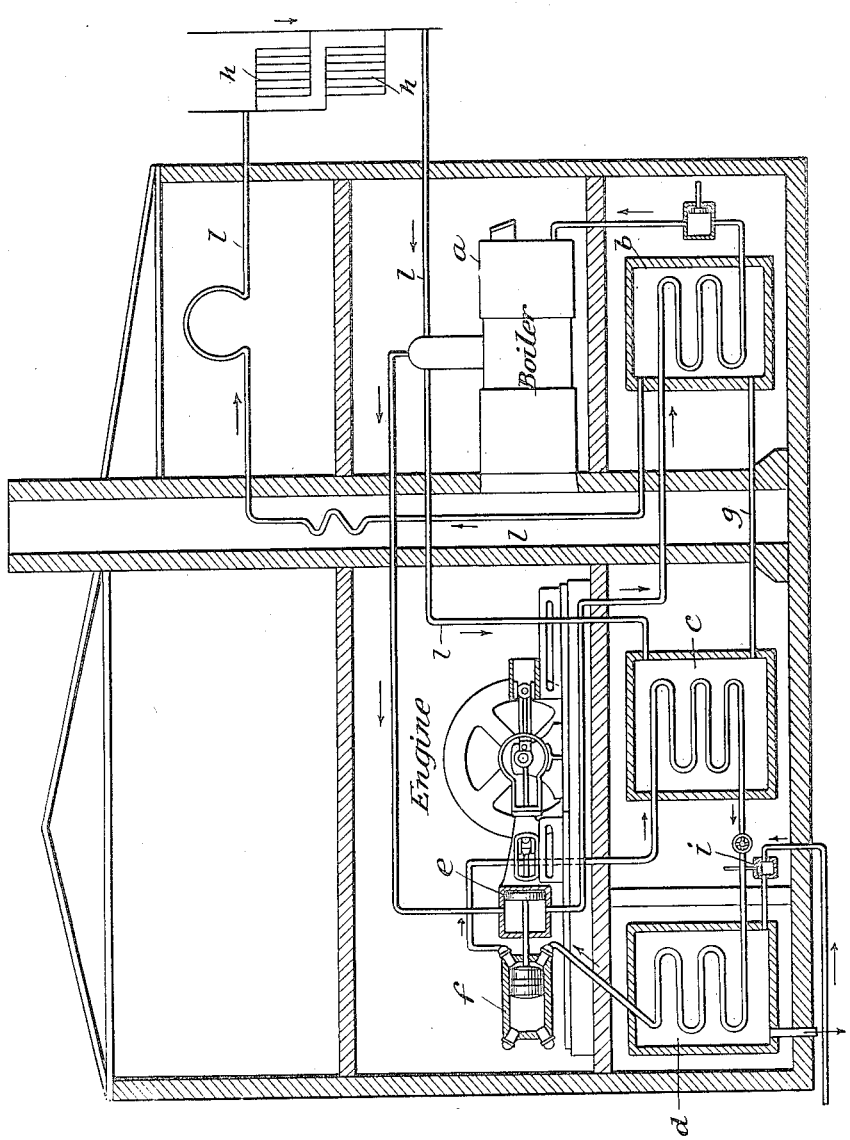

EDMUND ALTENKIRCH AND BERNHARD TENCKHOFF, OF BERLIN, GERMANY.

HEATING PLANT UTILIZING THE WASTE HEAT OF REFRIGERATING-MACHINES OF THE COMPRESSION OR ABSORPTION TYPE.

1,214,255.

Specification of Letters Patent. Patented Jan. 30, 1917.

Application filed January 6, 1912. Serial No. 670,181.

*To all whom it may concern:*

Be it known that we, EDMUND ALTENKIRCH and BERNHARD TENCKHOFF, citizens of the German Empire, residing in the city of Berlin, in the Kingdom of Prussia, in said Empire, have invented certain new and useful Improvements in Heating Plants Utilizing the Waste Heat of Refrigerating-Machines of the Compression or Absorption Type, of which the following is a specification.

This invention relates to an improved heating plant utilizing the waste-heat of refrigerating machines of the compression or absorption type, together with the heat of the motor-engines used for the same.

Heating plants in which a transference of heat of lower temperature to a higher temperature takes place, also heating plants by which the waste-heat of refrigerating machines is utilized, were proposed heretofore. On the other hand, it is also well known that the waste-heat of heat-engines, and more especially the exhaust-heat of the same, has been used for heating purposes, but in many cases, as, for instance, in sanatoria and other buildings of larger size, the heat required for the heating plant is so great that the exhaust-heat of a heat-engine, provided that the same is used for illuminating and other purposes, is not sufficient for supplying the required quantity of heat for the heating plant. A considerable saving in fuel, however, can be obtained when the two heating systems referred to are combined into one unitary whole, that is to say, when the waste-heat of the condenser of a heat-engine is employed in connection with the heat of the condenser of a refrigerating machine, and with the heat of the products of combustion from the boiler-furnace of the heat-engine for heating the heat-conveying medium of a heating plant; and for this purpose the invention relates to the utilization of the waste-heat in the condenser of a refrigerating machine, and of the waste-heat obtained from the condenser of a heat-engine or other waste-heat for the heating of the heat-carrying medium of a heating system. The waste-heat of the heat-engine is thereby transferred directly as waste-heat from the heat-engine to the heating medium of a heating plant, while a certain fraction thereof, however, is converted into useful work for running the refrigerating machine, which again transmits the heat of the ground-water or of the exterior air through its condenser to the heating medium, while the fraction of that heat which has been converted into useful work is then again given off, and utilized likewise with a considerably increased heat value in the cycle of the heating medium.

In the accompanying drawing, the figure represents diagrammatically one embodiment of our improved system of utilizing the waste-heat of a compression refrigerating machine together with the waste-heat from the heat-engine of the same.

Similar letters of reference indicate corresponding parts in the figure of the drawing.

Referring to the drawing, $a$ represents a steam-boiler, $b$ the condenser of the steam-engine, $d$ the refrigerator, and $c$ the condenser of a compression refrigerating machine.

$e$ represents the steam-cylinder and $f$ the compressing cylinder.

The heating medium which is returned from the radiators $h$ by the conducting pipes $l$ in relatively cool condition is conducted first through the condenser $c$ of the refrigerating machine and heated by the coils of the same, then conducted through a connecting pipe $g$ to the condenser $b$ of the steam-engine, and then returned in heated condition to the radiators of the heating system. Of course, the condensers of the steam-engine and of the refrigerating machine are maintained above the temperature of the region to be heated.

In the embodiment shown in the figure it is assumed that the heating of the refrigerator is accomplished by means of ground-water which is supplied by the pump $i$. The gain in heat with this use of the ground-water is especially large owing to the small difference in temperature, and is the more valuable, as contra-distinguished from the generation of cold, the greater the depth from which the water is supplied.

In cases where the ground-water or the water which is supplied by a water-service company cannot be obtained in sufficient quantity, then the heat of the atmosphere has to be used. For preventing the formation of frost on the metallic surfaces, the exchange of heat can be produced in the well known manner by means of open brine-tanks. In this case the heat of the remaining products of combustion can be utilized by subjecting the circulating brine, before being delivered to the refrigerating machine, to the heat of the products of combustion on their way to the chimney.

The useful features which have been before stated for the compression refrigerating machine are also taken advantage of in absorption refrigerating machines. The heat which is generated in the condenser and absorber of the same is always greater than the heat required for the refrigerating effect of the machine by an amount equivalent to the cooling power of the refrigerator.

It is obvious and advisable that a heat-engine of somewhat greater power should be selected than would be necessary for driving the refrigerating machine, so that also light and power can be produced by the engine, as thereby the more economical working of the plant is obtained, or the heat-engine may be used for this purpose during the periods when no heating is required, or when a smaller quantity of heat is necessary. Furthermore, the refrigerating machine may be applied during the summer and other periods when no heating is required, for the production of ice and other refrigerating purposes, and in the winter simultaneously for refrigerating and heating purposes, so that such combination plants can be introduced to advantage where they would not be economical enough when used solely for heating purposes.

We claim:

1. A plant for heating purposes, comprising a heat engine, a refrigerating machine driven thereby, condensers for said heat engine and said refrigerating machine, and means for placing the condensers of said heat engine and of said refrigerating machine in thermal connection with the region to be heated, said condensers being maintained above the temperature of the region to be heated, said condensers being thermally connected with each other.

2. A plant for heating purposes, comprising a heat engine having a condenser, a refrigerating machine, driven by said heat engine and having a condenser, a heat conveying medium, means for placing said medium in thermal connection with the condenser of said heat engine and the condenser of said refrigerating machine, to be heated by both, said condensers being maintained above the temperature of the region to be heated, said condensers being thermally connected with each other, means for transporting said medium to the region to be heated, and means for returning the cooled medium to the said condenser of the heat engine and the condenser of the refrigerating machine, there to be reheated.

In testimony whereof we affix our signatures in presence of two witnesses.

EDMUND ALTENKIRCH.
BERNHARD TENCKHOFF.

Witnesses:
  HENRY HASPER,
  WOLDEMAR HAUPT.